(12) United States Patent
Manzoor

(10) Patent No.: US 10,415,684 B2
(45) Date of Patent: Sep. 17, 2019

(54) TORSIONAL VIBRATION DAMPERS HAVING A PLURALITY OF ELASTOMERIC RING BUSHINGS

(71) Applicant: Suhale Manzoor, Plymouth, MI (US)

(72) Inventor: Suhale Manzoor, Plymouth, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 83 days.

(21) Appl. No.: 15/482,095

(22) Filed: Apr. 7, 2017

(65) Prior Publication Data

US 2017/0292583 A1    Oct. 12, 2017

Related U.S. Application Data

(60) Provisional application No. 62/319,472, filed on Apr. 7, 2016.

(51) Int. Cl.
| F16H 55/36 | (2006.01) |
| F16H 55/56 | (2006.01) |
| F16F 15/124 | (2006.01) |

(52) U.S. Cl.
CPC ........... *F16H 55/36* (2013.01); *F16F 15/124* (2013.01); *F16H 55/566* (2013.01); *F16H 2055/366* (2013.01)

(58) Field of Classification Search
CPC . Y10T 74/2131; F16H 2055/366; F16D 3/70; F16F 15/124; F16F 15/442
USPC .......................................................... 474/94
See application file for complete search history.

(56) References Cited

U.S. PATENT DOCUMENTS

| 447,447 | A | * | 3/1891 | Daily | .................. F16H 61/6647 476/1 |
| 1,701,518 | A | * | 2/1929 | Walker | ................ F16F 15/1442 74/574.4 |
| 1,872,136 | A | * | 8/1932 | Gibson | .................. F16F 15/124 464/71 |
| 1,894,432 | A | * | 1/1933 | Watson | ..................... E21B 1/02 152/49 |
| 1,925,071 | A | * | 8/1933 | Griswold | ............ F16F 15/1492 74/574.4 |
| 2,092,571 | A | * | 9/1937 | Cole | .................... F16F 15/1428 464/68.4 |

(Continued)

*Primary Examiner* — Henry Y Liu
(74) *Attorney, Agent, or Firm* — FisherBroyles, LLP; Susan M. Oiler

(57) ABSTRACT

Torsional vibration dampers are disclosed that have a hub defining a plurality of fastener-receiving openings and an inertia member concentric about and spaced a radial distance apart from a shaft-receiving member of the hub and having a plurality of receptacles defining a bore oriented axially. Each receptacle aligns with one of the plurality of fastener-receiving openings, and receives one of a plurality of elastomeric rings with a fastener seated therein and received in the fastener-receiving openings to operatively connect the inertia member to the hub through compression of the elastomeric rings. The height of each elastomeric ring is greater than the axial width of the receptacles, and compression of the elastomeric rings deforms each radially into a first gap between the hub and the inertia member and a second gap between the inertia member and the fastener, thereby axially locking the inertia member to the hub for rotation together.

19 Claims, 5 Drawing Sheets

(56) References Cited

U.S. PATENT DOCUMENTS

| | | | | |
|---|---|---|---|---|
| 2,399,122 A * | 4/1946 | Johnson | | B02C 17/24 241/176 |
| 2,450,701 A * | 10/1948 | Wahlberg | | F16D 3/70 29/450 |
| 2,538,499 A * | 1/1951 | Benoit | | D01H 1/241 464/137 |
| 2,580,839 A * | 1/1952 | Riopelle | | F16F 15/1442 74/574.4 |
| 2,622,418 A * | 12/1952 | Howison | | F16D 3/70 464/71 |
| 2,622,419 A * | 12/1952 | McIntyre | | F16D 3/70 267/153 |
| 2,839,116 A * | 6/1958 | Friedl | | B60B 9/005 152/31 |
| 3,861,828 A * | 1/1975 | Biermann | | B64C 11/008 416/145 |
| 4,302,986 A * | 12/1981 | Shepherd | | F16F 15/1442 74/574.4 |
| 4,486,183 A * | 12/1984 | Posiviata | | F16D 3/68 267/148 |
| 4,585,431 A * | 4/1986 | Umeda | | B62D 55/0963 474/161 |
| 4,617,884 A * | 10/1986 | Allen | | F02B 75/06 123/192.1 |
| 5,069,654 A * | 12/1991 | Rampe | | F16D 1/0805 29/892 |
| 5,540,626 A * | 7/1996 | Asai | | F16F 15/124 474/178 |
| 6,283,076 B1 * | 9/2001 | Simpson | | F16H 7/06 123/192.1 |
| 6,336,882 B1 * | 1/2002 | Ullein | | F01L 1/02 474/161 |
| 6,386,065 B1 * | 5/2002 | Hodjat | | F16F 15/126 474/94 |
| 6,456,807 B1 * | 9/2002 | Makino | | F16F 1/3732 399/167 |
| 6,508,713 B1 * | 1/2003 | Kaye | | F16F 15/124 464/71 |
| 6,742,412 B2 * | 6/2004 | Feldhaus | | F16F 15/145 188/378 |
| 6,796,919 B2 * | 9/2004 | Johnson | | F16H 55/36 474/164 |
| 6,802,779 B2 * | 10/2004 | Tabuchi | | F16D 3/68 464/32 |
| 6,875,113 B2 * | 4/2005 | Nichols | | F16F 15/1442 464/90 |
| 8,591,344 B2 * | 11/2013 | Duerre | | F16F 15/1442 464/180 |
| 8,656,807 B2 * | 2/2014 | McCalmont | | F16F 15/1442 464/71 |

* cited by examiner

TORSIONAL VIBRATION DAMPERS HAVING A PLURALITY OF ELASTOMERIC RING BUSHINGS

RELATED APPLICATIONS

This application claims the benefit of U.S. Application No. 62/319,472, filed Apr. 7, 2016, which is incorporated herein by reference in its entirety

TECHNICAL FIELD

The present invention relates to torsional vibration dampers, in particular, a damper system facilitated by a plurality of elastomeric rings, which, in the assembled state, deform radially into a first clearance gap between the hub and the inertia member and a second clearance gap between the inertia member and the fastener, thereby axially locking the inertia member to the hub for rotation together.

BACKGROUND

Torsional vibration dampers (TVDs) are used in the automotive industry to reduce vibrations in a shaft (crankshaft, drive shaft, prop shaft, etc.), thereby enhancing its fatigue life. The simplest torsional vibration damper consists of three functional components: (1) a hub, which is a rigid structural bracket that attaches the torsional vibration damper to the shaft; (2) an elastomer, which provides a spring damper system for the torsional vibration damper; and (3) an active inertial mass called the ring, which vibrates with a magnified amplitude, but exactly opposite phase relative to the shaft vibration(s). In most elastomer-based torsional vibration dampers, there are two mechanisms that actively reduce vibration: (1) by absorption of the vibrations due to tuning the torsional vibration damper to a particular frequency; and (2) by viscous damping due to the elastomeric material and the inertial system. In addition to vibration attenuation, torsional vibration dampers that are attached to the crankshaft of an internal combustion engine also power an external belt drive through an endless belt system that drives the front end accessory drive system.

There is always a need for better, less complex, less expensive, easier to manufacture, easier to assemble or disassemble torsional vibration dampers.

SUMMARY

The torsional vibration dampers disclosed herein reduce the mass and parasitic inertia of the hub, increase the space available to pack the inertia ring, reduce the volume of the elastomeric material needed (reducing cost), provide infinite slip torque, provide an easier to assemble configuration, and compress the elastomeric material without the violent process of insertion, all of which will be appreciated from the description of the TVD below.

In one aspect, torsional vibration dampers are disclosed that have a hub with a shaft-receiving member defining an axis of rotation and a mounting base extending radially outward from the shaft-receiving member. The mounting base defines a plurality of fastener-receiving openings. The TVDs have an inertia member with an annular ring thereof concentric about and spaced a radial distance apart from the shaft-receiving member of the hub. The inertia member has a plurality of receptacles, each defining a bore oriented axially to each receive an elastomeric ring. In the assembled state, the plurality of receptacles align, one each with one of the plurality of fastener-receiving openings in the hub. Each receptacle has an elastomeric ring seated therein, and each elastomeric ring has received a fastener. Collectively, the plurality of fasteners operatively connect the inertia member to the hub only through compression of the plurality of elastomeric rings upon receipt in respective fastener-receiving openings in the hub. The height of each of the plurality of elastomeric rings is greater than the axial width of each of the plurality of receptacles, and compression of each of the plurality of elastomeric rings deforms each elastomeric ring radially into a first gap between the hub and the inertia member and a second gap between the inertia member and the fastener, thereby axially locking the inertia member to the hub for rotation therewith.

For the above TVDs, the plurality of fasteners have either a shoulder or a sleeve that defines a preselected amount of compression of each elastomeric ring, the inner diameter of each of the plurality of elastomeric rings has a slip fit to one each of the plurality of fasteners, and the mounting base of the hub comprises a plurality of arms, each having one of the plurality of fastener-receiving openings. The annular ring of the inertia member may have a belt-engaging surface, such as a plurality of grooves or a flat face.

Each of the plurality of elastomeric rings used in the TVDs is either an extruded or molded ring. The extruded or molded ring can have axially oriented teeth on the exterior or interior of the radial-facing surfaces thereof, or have a grommet-shaped exterior of the radially-outward facing surface thereof. Further, each of the plurality of elastomeric rings can have one or more of an inner diameter sleeve and an outer diameter sleeve. Further, the inner diameter of each of the plurality of elastomeric rings is configured to have a slip fit to one each of the plurality of fasteners.

In one aspect, front end accessory drive systems are disclosed that include any one of the torsional vibration dampers disclosed herein, in particular having a TVD mounted to a shaft with the shaft received in the shaft-receiving member of the hub.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
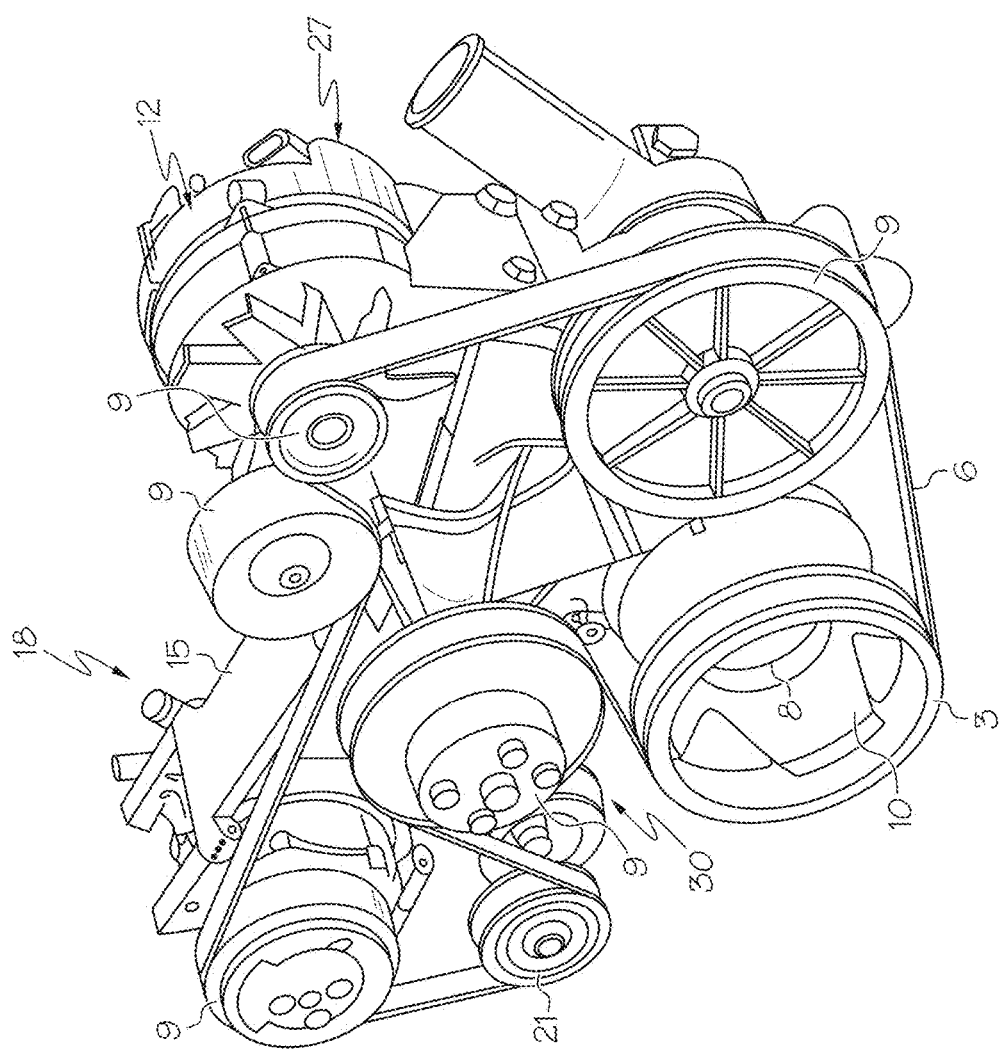
FIG. 1 is a perspective view of components in a front end accessory drive.

The patent or application file contains at least one drawing executed in color. Copies of this patent or patent application publication with color drawing(s) will be provided by the Office upon request and payment of the necessary fee.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 3:
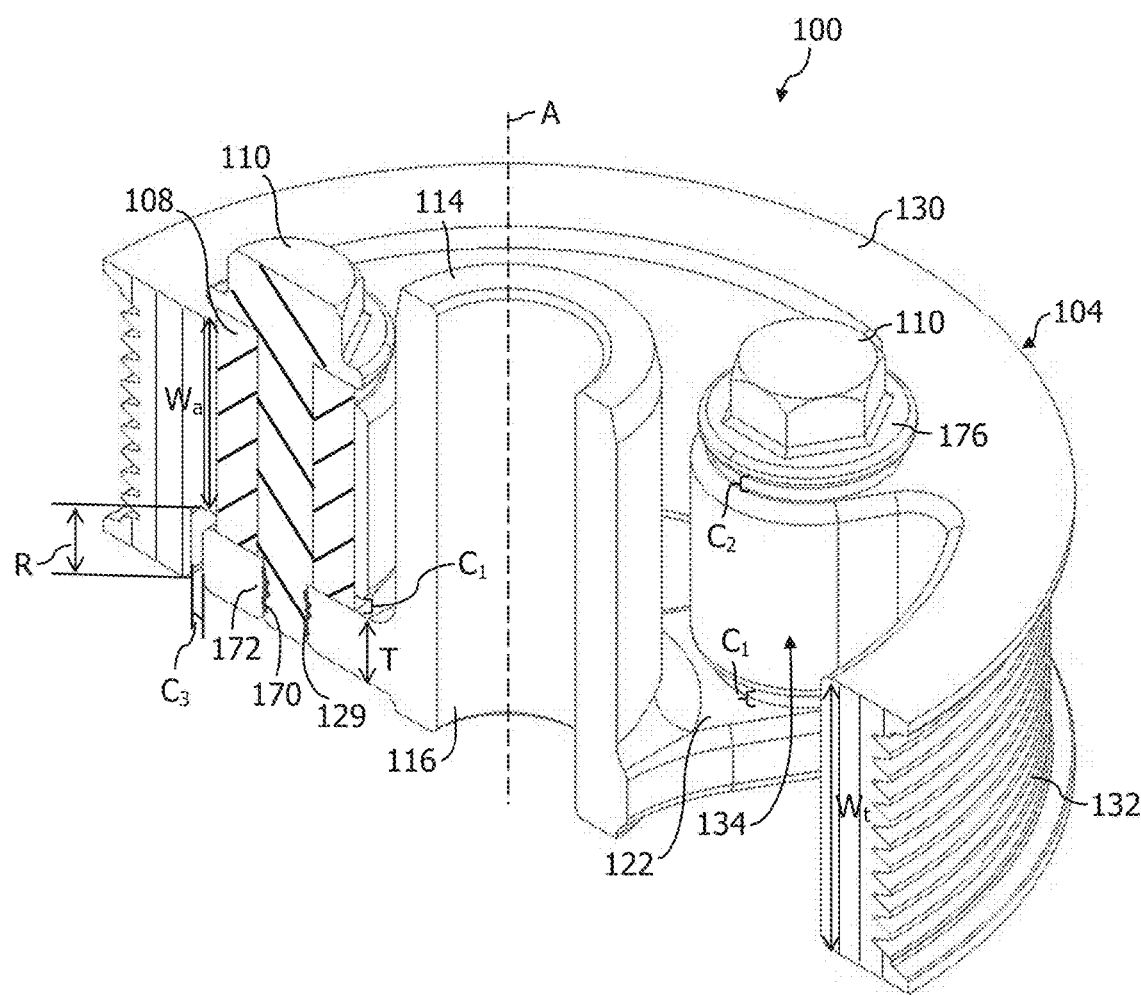
FIG. 3 is a longitudinal cross-section of the torsional vibration damper of FIG. 2 in an assembled state.
Figure 4:
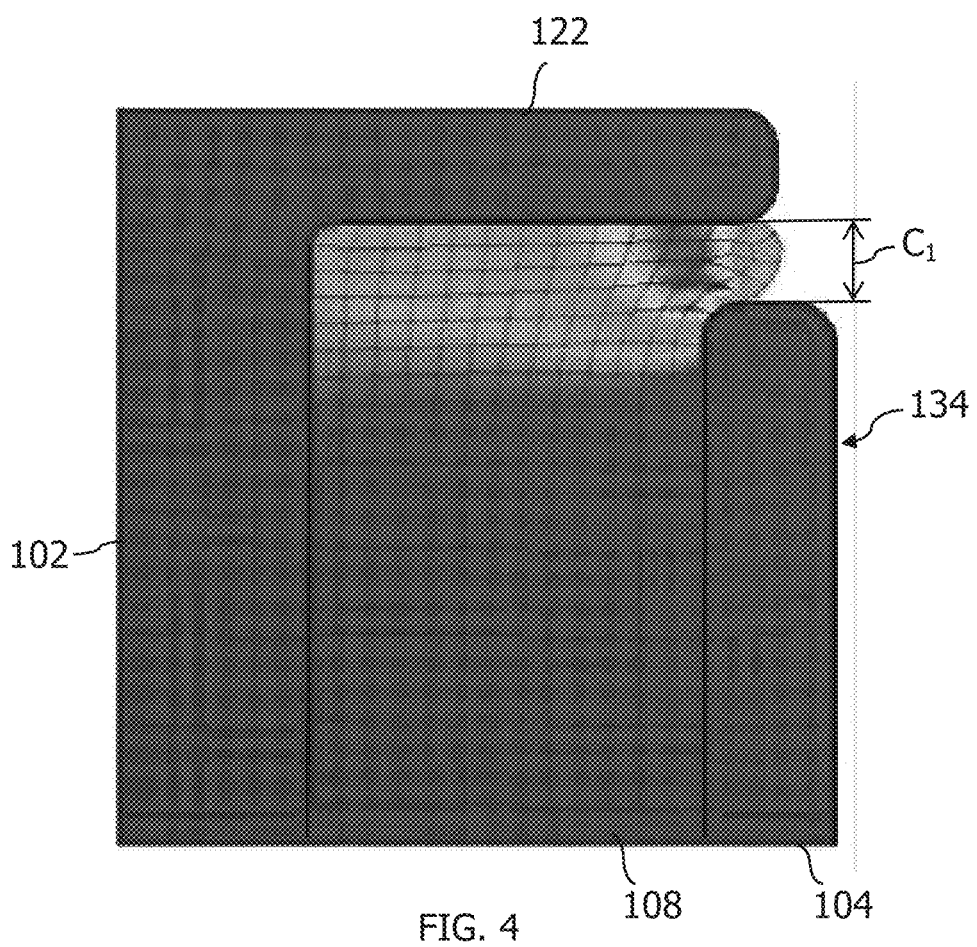
FIG. 4 is a finite element analysis model of the axial locking phenomena by the compression of the elastomeric ring and its deformation between the hub and the inertia ring.

A new torsional vibration damper, generally designated by reference 100, exemplified in FIG. 3 is disclosed. The torsional vibration damper 100 reduces the mass and parasitic inertia of the hub, increases the space available to pack the inertia ring, reduces the volume of the elastomeric material needed (reducing cost), provides infinite slip torque, provides an easier to assemble configuration, and compresses the elastomeric material without the violent process of insertion.

Figure 2:
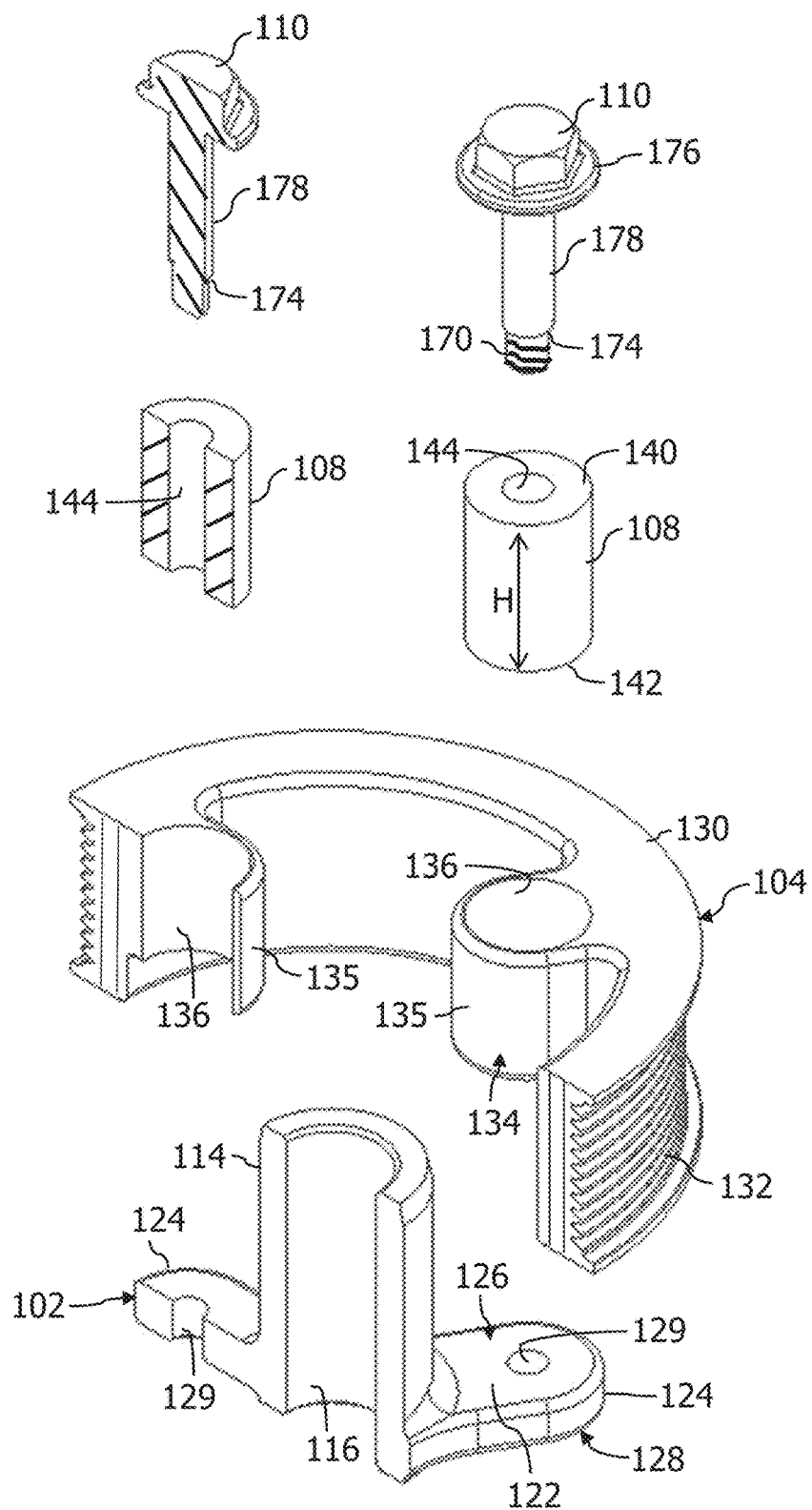
FIG. 2 is an exploded, perspective view of one embodiment of a torsional vibration damper.

Referring to FIG. 2, the torsional vibration damper 100 includes from bottom to top, relative to the orientation of the drawing relative to the page, a hub 102, an inertia ring 104, a plurality of elastomeric rings 108, and a plurality of fasteners 110. As labeled in FIG. 3, the plurality of fasteners 110 operatively connect the inertia ring 104 to the hub 102 and place the elastomeric rings 108 in compression, with axial deformation thereof, into a first clearance gap $C_1$ (oriented axially) between the hub 102 and the inertia member 104 and a second clearance gap $C_2$ (also oriented axially) between the inertia member 104 and each of the plurality of fasteners 110. There is a third clearance gap $C_3$ (oriented radially) between the hub 102 and the inertia member 104. The clearance gaps $C_1$ through $C_3$ make it so that the fasteners 110 do not directly couple the hub 102 to the inertia member 104. Instead, the hub 102 is operatively coupled to the inertia member 104 for rotation therewith through the compression of the plurality of elastomeric rings 108, which, in the assembled state, deform radially into the first clearance gap $C_1$ between the hub 102 and the inertia member 104 and a second clearance gap $C_2$ between the inertia member 104 and the fastener 110, thereby axially locking the inertia member 104 to the hub 103 for rotation together. The assembly of the components using the fasteners 110 provides the extra advantage (besides the ease of assembly) of being able to replace one of the elastomeric rings at a time.

Still referring to FIGS. 2 and 3, the hub 102 defines an axis of rotation A (FIG. 3) for the torsional vibration damper 100 and includes a mounting base 122 extending radially outward from a shaft-receiving member 114 that defines a bore 116. The shaft-receiving member 114 may extend axially in only one direction from the base 122, thereby defining the back face of the torsional vibration damper 100, which in an embodiment such as the one illustrated in FIG. 1 is facing the engine. The face of mounting base 122, facing the direction that the shaft-receiving member 114 extends, is identified as the first face 126 and opposite thereof is a second face 128. The mounting base 122 defines a plurality of fastener-receiving openings 129 in at least the first face 126, but the openings 129 may also extend through the mounting base to the second face 128. The mounting base 122 may be a plurality of arms 124 that each define one of the plurality of fastener-receiving openings 129. Using arms 124, rather than a continuous annular plate, saves on material costs and reduces the mass of the hub, which is beneficial to reducing the parasitic inertia of the hub.

The bore 116 of the hub 102 is configured (shaped and sized) to receive and be coupled to a shaft for rotational movement therewith, and may include an alignment feature (not shown) for mating with a mating alignment feature (not shown) on a shaft. In one embodiment, the alignment feature may be a keyway and in another embodiment may be a key for mating with a keyway in a shaft. In FIG. 1, one exemplary embodiment, the shaft is a crankshaft of a FEAD system 18. The FEAD system may include engine drive accessories 9 mounted thereto that are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12. While FIG. 1 illustrates a FEAD with a crankshaft, the shaft upon which the torsional vibration damper 100 may be mounted is not limited thereto, and in other embodiments, the shaft may be a drive shaft, a prop shaft, or the like.

Still referring to FIGS. 2 and 3, the inertia member 104 has an annular ring 130 that includes a belt engaging surface 132 as its radially outermost surface. The belt engaging surface 132 may be flat, contoured to receive a rounded belt, or have V-grooves for mating with the V-ribs of a V-ribbed belt or any other required contoured groove to mate with an endless belt. The annular ring 130 is concentric about and spaced a radial distance apart from the shaft-receiving member 114 of the hub 102. Also, the annular ring 104 has a plurality of receptacles 134, each defined by a radially inwardly protruding nodule 135 that each define a bore 136 oriented axially to receive one of the plurality of elastomeric rings 108. Each receptacle aligns with one of the plurality of fastener-receiving openings 129 in the hub 102.

The receptacles each have an axial width $W_a$ that is less than the total width $W_t$ of the annular ring 130 of the inertia member 104 and are each recessed axially a distance R from the face of the annular ring 130 facing the first face 126 of the hub 102. The distance R is greater than the thickness T of the mounting base 122 of the hub 102, thereby defining the first clearance gap $C_1$ for each of the receptacles, into which a portion of the elastomeric material of an elastomeric ring is received when placed into compression by a fastener 110. At the opposing face of the annular ring 130, the receptacles 134 may be flush with the exterior surface of the annular ring or may be recessed a distance axially inward therefrom.

The inertia member 104 and/or the hub 102 may be cast, spun, forged, machined, or molded using known or hereinafter developed techniques. Suitable material for the hub 102 includes iron, steel, aluminum, other suitable metals, plastics, or a combination thereof, including composite materials. The inertia member 104 may be made from material having a sufficient mass, usually a cast iron metal.

Now turning to the plurality of elastomeric rings 108, these members are generally cylindrical annular bodies having opposing end faces 140, 142 spaced apart a distance, which is referred to herein as the height H of each elastomeric ring, and define a bore 144 from end face 140 to end face 142 that is generally parallel to the height H. The height H of each of the plurality of elastomeric rings 108 is greater than the axial width $W_a$ of each of the plurality of receptacles 134. The height H of the elastomeric rings 108 provides elastomeric material for deformation by compression into the first and second clearance gaps $C_1$, $C_2$, which axially locks the inertia member 104 to the hub 102.

The elastomeric rings 108 may be any suitable elastomer to absorb and/or damp the torsional vibrations generated by a rotating shaft upon which the torsional vibration damper 100 is mounted. The elastomeric members may have a generally low tensile modulus and high break strain. The elastomeric members may be made from the same or different elastomers. The elastomer is preferably one suitable for automotive engine applications, i.e., suitable to withstand temperatures experienced in the engine and road temperatures and conditions. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber.

Figures 5A, 5B, 5C, 5D:
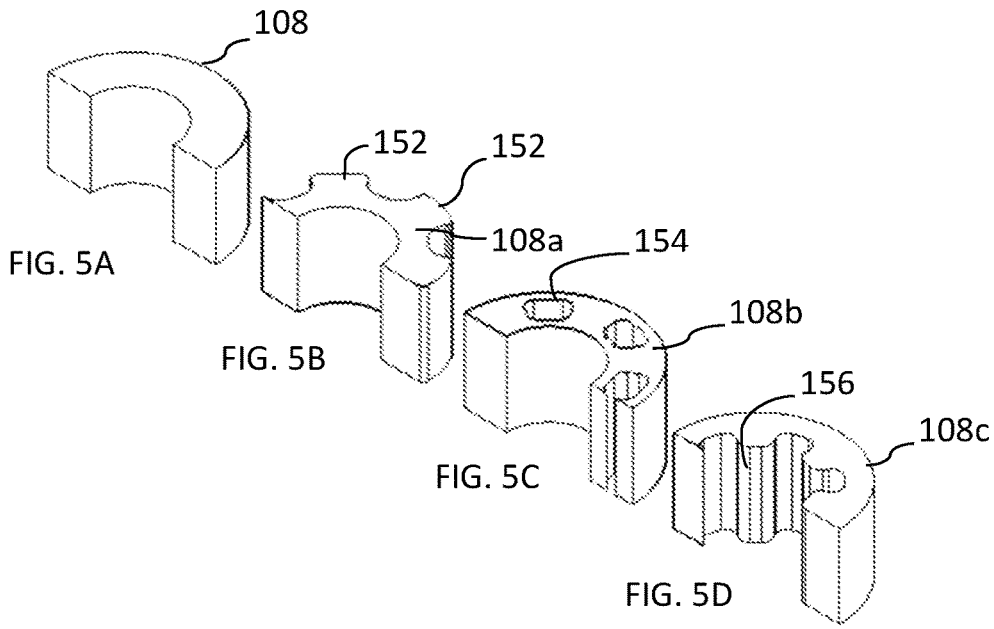
FIGS. 5A-5H are alternate embodiments for the elastomeric rings.

The elastomeric rings 108 are extruded or molded rings, which are generally fast and cheap manufacturing processes. Now referring to FIGS. 5A through 5H, various embodiments for the elastomeric rings 108 are illustrated. FIGS. 5A through 5D illustrate embodiments that may be extruded or molded. As shown in FIG. 5B, the elastomeric rings 108a can be extruded or molded with axially oriented teeth 152 as part of the surface defining the outer diameter of each ring. As shown in FIG. 5D, the elastomeric rings 108c can be extruded or molded with axially oriented teeth 156 as part of the surface defining the inner diameter of each ring. As shown in FIG. 5C, the elastomeric rings may include a plurality of axially oriented, spaced apart bores 154 (i.e., parallel to the height H) through each ring.

Figures 5E, 5F, 5G, 5H:
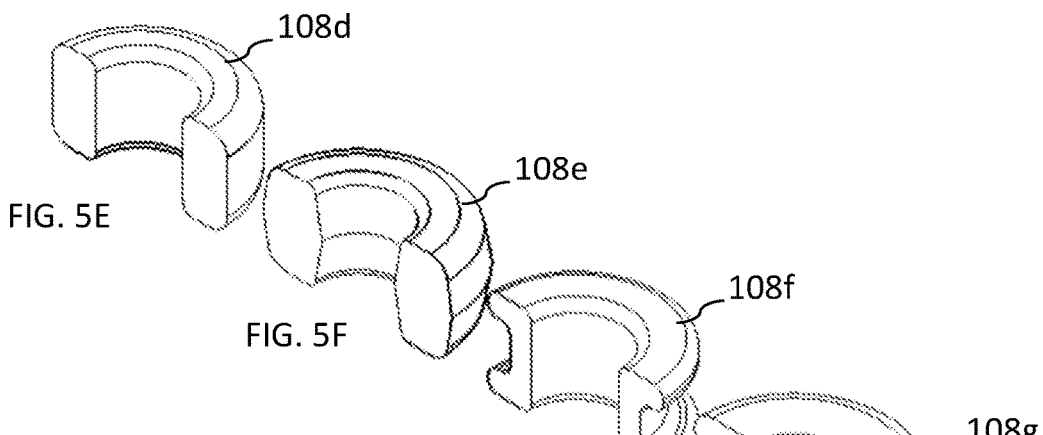
Figure 6A:
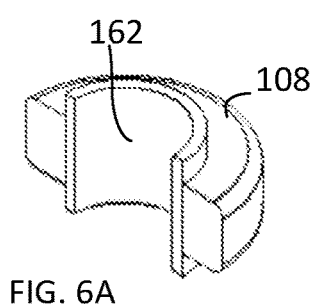
FIGS. 6A and 6B are embodiments illustrating an inner and/or outer diameter sleeve for the elastomeric rings.
Figure 6B:
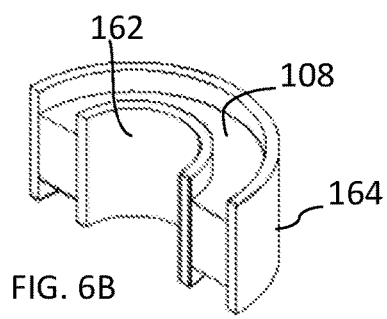

FIGS. 5E through 5H illustrate embodiments that are molded. FIG. 5E is a simple molded annular ring. FIG. 5F is a simple molded annular ring with a pronounced double draft molded shape. FIG. 5G is an annular ring having a grommet-shaped exterior of the radially-outward facing surface. FIG. 5H is an annular ring with a trapezoidal cross-section. Any one of the embodiments in FIGS. 5A through 5H may include one or more of an inner diameter sleeve 162 and an outer diameter sleeve 164 as shown in FIGS. 6A-6B, when a non-shouldered bolt or a straight rivet, or other straight fastener is used. The sleeves define and limit the compression a fastener applies to an elastomeric ring 108.

The fasteners 110 include, but are not limited to, bolts, shoulder bolts, socket head cap screws, screws, rivets, or the like. When the fasteners 110 include threads 170, the fastener-receiving openings 129 in the hub 102 (FIG. 3) have threading 172 to receive the threads 170 of one of the fasteners 108. In one embodiment, the fasteners 110 are shoulder bolts as illustrated in FIGS. 2 and 3. The shoulder 174 of each fastener 108 hits a hard stop against the first surface 126 of the hub 102, when assembled, which ensures a pre-defined amount of compression of the elastomeric ring 108. Each fastener 108 also includes a flanged head 176 with a shaft 178 extending between the flanged head and the shoulder 174. The flanged head 176 applies compressive forces on the elastomeric ring 108 and the shaft 178 is of a length that enables the flanged head 176 to define the second clearance gap $C_2$ relative to the receptacle 134 of the inertia member 104. As seen in the assembled torsional vibration damper 100 of FIG. 3, the fasteners 110 extend through bores 144 in respective elastomeric rings 108 and each is received in fastener-receiving openings 129 in the mounting base 122 of the hub 102. In FIG. 3, each of the fasteners 110, shoulder bolts, is threadedly connected to the mounting base 122 of the hub 102 and the compression of the elastomeric rings is defined by the position of the shoulder 174 of the fastener 110. As explained above, in an alternate embodiment, a straight bolt, rivet, or other fastener can be used with a sleeve (inner and/or outer) as shown in FIGS. 6A and 6B to define the compression of the elastomeric rings.

The use of fasteners 110 is beneficial because it provides the ability to remove a fastener and replace at least one of the elastomeric rings 108. Additionally, it enables repeated assembly and disassembly thereof, and simplifies the original assembly operation by eliminating the need for an assembly press, roll-forming, or press-fitting of the components.

Finite element analysis of the torsional vibration dampers disclosed herein reveals that the first mode is torsional at 120 Hz and the second mode is conical at 199 Hz. As such, adequate modal separation is present indicating proper noise, vibration, and harshness (NVH) performance.

Although the invention is shown and described with respect to certain embodiments, it is obvious that modifications will occur to those skilled in the art upon reading and understanding the specification, and the present invention includes all such modifications.

What is claimed is:

1. A torsional vibration damper comprising:
a hub having a shaft-receiving member defining an axis of rotation and having a mounting base extending radially outward from the shaft-receiving member and defining a plurality of fastener-receiving openings;
a plurality of elastomeric rings;
an inertia member having an annular ring concentric about and spaced a radial distance apart from the shaft-receiving member of the hub and having a plurality of receptacles, each defining a bore oriented axially to receive one of the plurality of elastomeric rings, wherein each of the plurality of receptacles align with one of the plurality of fastener-receiving openings in the hub;
a plurality of fasteners operatively connecting the inertia member to the hub only through compression of the plurality of elastomeric rings, wherein one each of the plurality of fasteners is seated in each of the plurality of elastomeric rings and is received in one of the plurality of fastener-receiving openings in the hub;
wherein the height of each of the plurality of elastomeric rings is greater than the axial width of each of the plurality of receptacles, and compression of each of the plurality of elastomeric rings deforms each elastomeric ring radially into a first gap between the hub and the inertia member and a second gap between the inertia member and the fastener, thereby axially locking the inertia member to the hub for rotation therewith.

2. The torsional vibration damper of claim 1, wherein the plurality of fasteners have a shoulder or a sleeve that defines a preselected amount of compression of each elastomeric ring.

3. The torsional vibration damper of claim 1, wherein the inner diameter of each of the plurality of elastomeric rings has a slip fit to one each of the plurality of fasteners.

4. The torsional vibration damper of claim 1, wherein the mounting base of the hub comprises a plurality of arms, each having one of the plurality of fastener-receiving openings.

5. The torsional vibration damper of claim 1, wherein the annular ring of the inertia member has a belt-engaging surface.

6. The torsional vibration damper of claim 5, wherein the belt engaging surface includes a plurality of grooves.

7. The torsional vibration damper of claim 1, wherein each of the plurality of elastomeric rings is an extruded or molded ring.

8. The torsional vibration damper of claim 7, wherein the extruded or molded ring comprises axially oriented teeth on the exterior or interior of the radial-facing surfaces thereof, or has a grommet-shaped exterior of the radially-outward facing surface thereof.

9. The torsional vibration damper of claim 7, wherein each of the plurality of elastomeric rings includes one or more of an inner diameter sleeve and an outer diameter sleeve.

10. A front end accessory drive system comprising:
a torsional vibration damper mounted to a crankshaft, the torsional vibration damper comprising:
a hub having a shaft-receiving member defining an axis of rotation and having a mounting base extending radially outward from the shaft-receiving member and defining a plurality of fastener-receiving openings;
a plurality of elastomeric rings;
an inertia member having an annular ring concentric about and spaced a radial distance apart from the shaft-receiving member of the hub and having a plurality of receptacles, each defining a bore oriented axially to receive one of the plurality of elastomeric rings, wherein each of the plurality of receptacles align with one of the plurality of fastener-receiving openings in the hub;
a plurality of fasteners operatively connecting the inertia member to the hub only through compression of the plurality of elastomeric rings, wherein one each of the plurality of fasteners is seated in each of the plurality of elastomeric rings and is received in one of the plurality of fastener-receiving openings in the hub;
wherein the height of each of the plurality of elastomeric rings is greater than the axial width of each of the plurality of receptacles, and compression of each of the plurality of elastomeric rings deforms each elastomeric ring radially into a first gap between the hub and the inertia member and a second gap between the inertia member and the fastener, thereby axially locking the inertia member to the hub for rotation therewith.

11. The front end accessory drive system of claim 10, wherein the plurality of fasteners have a shoulder or a sleeve that defines a preselected amount of compression of each elastomeric ring.

12. The front end accessory drive system of claim 10, wherein the inner diameter of each of the plurality of elastomeric rings has a slip fit to one each of the plurality of fasteners.

13. The front end accessory drive system of claim 10, wherein the annular ring of the inertia member has a belt-engaging surface.

14. The front end accessory drive system of claim 13, wherein the belt engaging surface includes a plurality of grooves.

15. The front end accessory drive system of claim 10, wherein the mounting base of the hub comprises a plurality of arms, each having one of the plurality of fastener-receiving openings.

16. The front end accessory drive system of claim 10, wherein each of the plurality of elastomeric rings is an extruded or molded ring.

17. The front end accessory drive system of claim 16, wherein the extruded or molded ring comprises axially oriented teeth on the exterior or interior of the radial-facing surfaces thereof, or has a grommet-shaped exterior of the radially-outward facing surface thereof.

18. The front end accessory drive system of claim 16, wherein each of the plurality of elastomeric rings includes one or more of an inner diameter sleeve and an outer diameter sleeve.

19. A system comprising a shaft having the torsional vibration damper of claim 1 mounted thereon with the shaft received in the shaft-receiving member of the hub.

* * * * *